(12) United States Patent
Farquhar et al.

(10) Patent No.: US 9,333,880 B2
(45) Date of Patent: May 10, 2016

(54) SYSTEM AND METHOD FOR CONTROLLING VEHICLE SEAT MOVEMENT

(71) Applicant: Lear Corporation, Southfield, MI (US)

(72) Inventors: Mark A. Farquhar, Ortonville, MI (US); David A. Hein, Sterling Heights, MI (US); Arjun Yetukuri, Rochester Hills, MI (US)

(73) Assignee: Lear Corporation, Southfield, MI (US)

( * ) Notice: Subject to any disclaimer, the term of this patent is extended or adjusted under 35 U.S.C. 154(b) by 20 days.

(21) Appl. No.: 13/834,378

(22) Filed: Mar. 15, 2013

(65) Prior Publication Data

US 2014/0277952 A1 Sep. 18, 2014

(51) Int. Cl.
*B60N 2/02* (2006.01)
*B60N 2/44* (2006.01)
*B60N 2/00* (2006.01)

(52) U.S. Cl.
CPC .............. *B60N 2/0244* (2013.01); *B60N 2/002* (2013.01); *B60N 2002/0268* (2013.01); *B60N 2002/0272* (2013.01)

(58) Field of Classification Search
CPC .... B60N 2/0224; B60N 2/002; B60N 2/0252; B60N 2/0244; B60J 10/00
USPC ............. 701/49; 180/274, 272, 273; 280/735; 297/342, 361.1
See application file for complete search history.

(56) References Cited

U.S. PATENT DOCUMENTS

| | | | | |
|---|---|---|---|---|
| 6,513,833 B2 * | 2/2003 | Breed | ...................... | B60J 10/00 180/272 |
| 6,590,354 B2 * | 7/2003 | Hein | .................... | B60N 2/0248 318/280 |
| 7,145,263 B2 * | 12/2006 | Nathan | ................... | B60N 2/002 180/271 |
| 7,243,945 B2 * | 7/2007 | Breed | .................... | B60N 2/002 180/274 |
| 7,407,029 B2 * | 8/2008 | Breed | .................... | B60N 2/002 180/173 |
| 7,556,306 B2 * | 7/2009 | Yetukuri | .............. | B60N 2/0224 296/63 |
| 2003/0090133 A1 * | 5/2003 | Nathan | .................. | B60N 2/002 297/217.3 |
| 2003/0209893 A1 * | 11/2003 | Breed | ...................... | B60J 10/00 280/735 |
| 2006/0208549 A1 * | 9/2006 | Hancock | .............. | B60N 2/0232 297/342 |
| 2007/0093963 A1 * | 4/2007 | Adams | ................... | A61G 5/042 701/301 |
| 2007/0114810 A1 * | 5/2007 | Yetukuri | .............. | B60N 2/0224 296/65.01 |
| 2008/0259510 A1 * | 10/2008 | Schussler | ................. | G05B 9/02 361/23 |
| 2009/0248255 A1 * | 10/2009 | Mattson | ............... | B60N 2/4858 701/49 |
| 2010/0295352 A1 | 11/2010 | Flucht et al. | | |
| 2011/0022274 A1 | 1/2011 | Jefferies et al. | | |
| 2011/0147051 A1 * | 6/2011 | Sims | ................. | B29C 45/14778 174/254 |
| 2012/0119548 A1 | 5/2012 | Abraham et al. | | |
| 2013/0341986 A1 * | 12/2013 | Willey | ................. | B60N 2/0252 297/361.1 |
| 2014/0277952 A1 * | 9/2014 | Farquhar | .............. | B60N 2/0244 701/49 |

FOREIGN PATENT DOCUMENTS

| | | |
|---|---|---|
| WO | 2008024306 | 2/2008 |
| WO | 2009103653 | 8/2009 |

* cited by examiner

*Primary Examiner* — Thomas G Black
*Assistant Examiner* — Wae Louie
(74) *Attorney, Agent, or Firm* — Brooks Kushman P.C.

(57) ABSTRACT

A system and method are disclosed for controlling movement of a seat in a vehicle. A sensor assembly includes a sensor configured to sense a presence of an object and to generate an output signal representing a proximity of the object to the sensor. A control unit is configured to receive the sensor output signal and to generate a control signal for use in controlling movement of the seat.

18 Claims, 7 Drawing Sheets

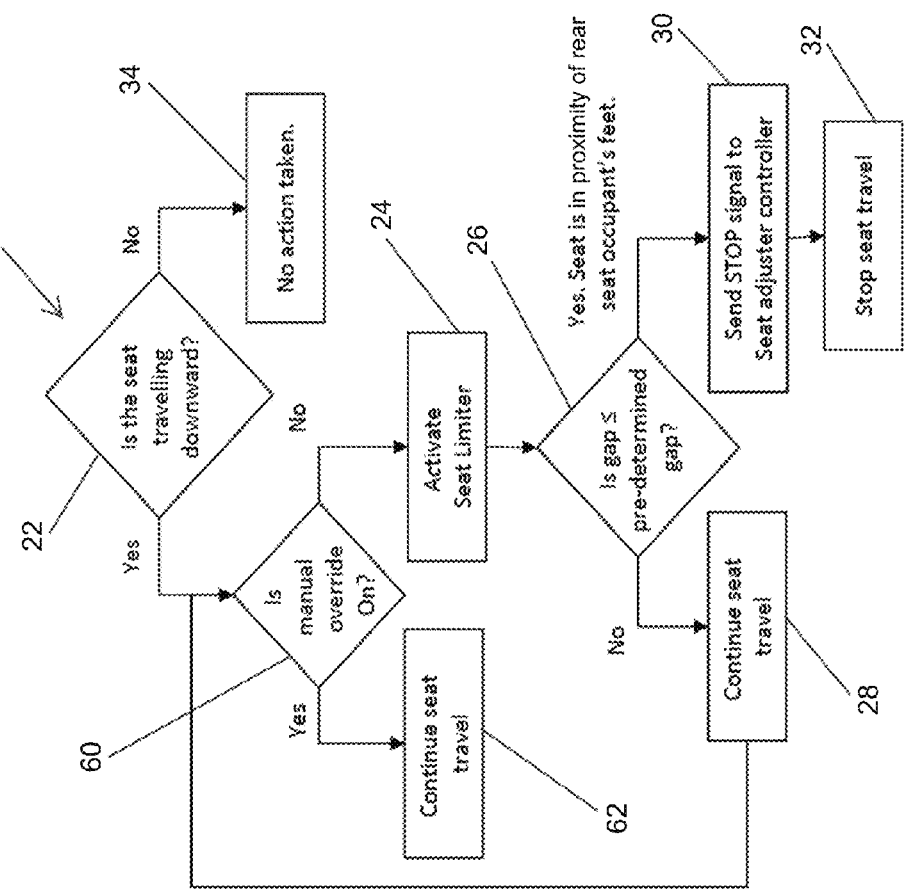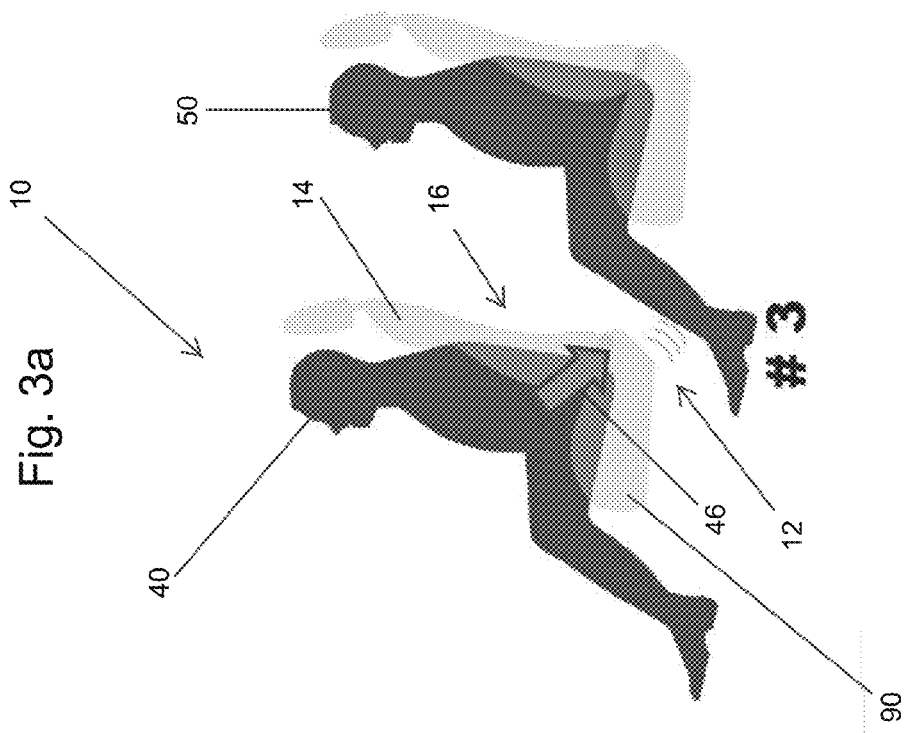

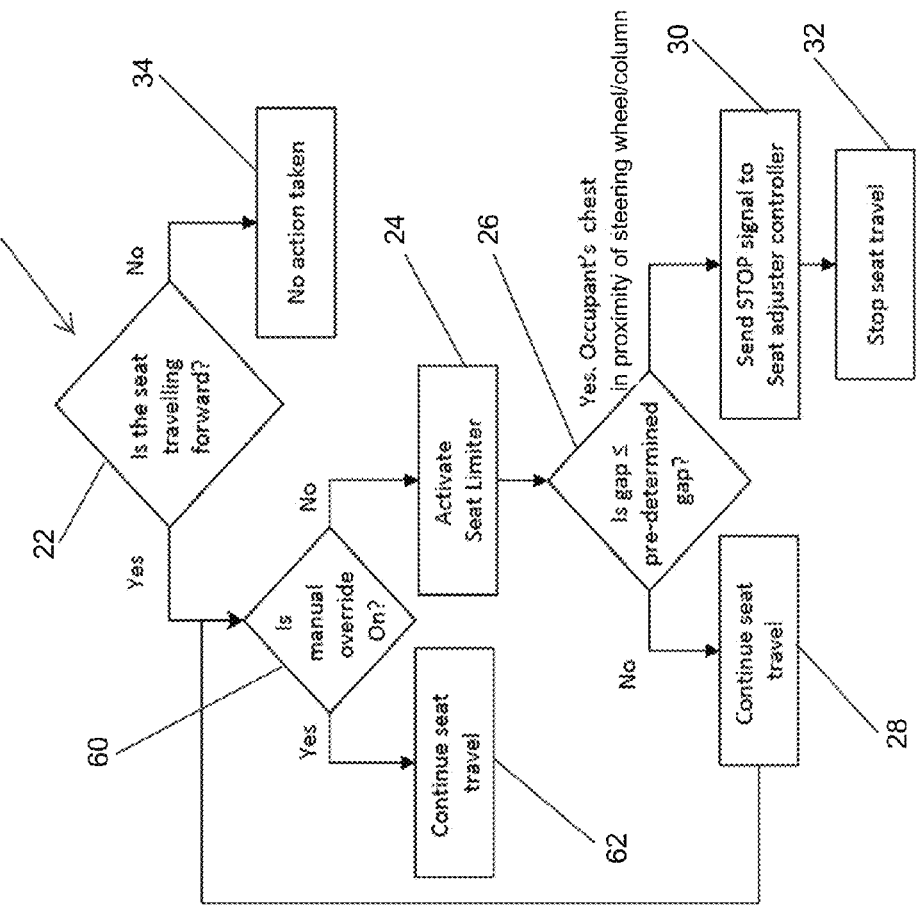
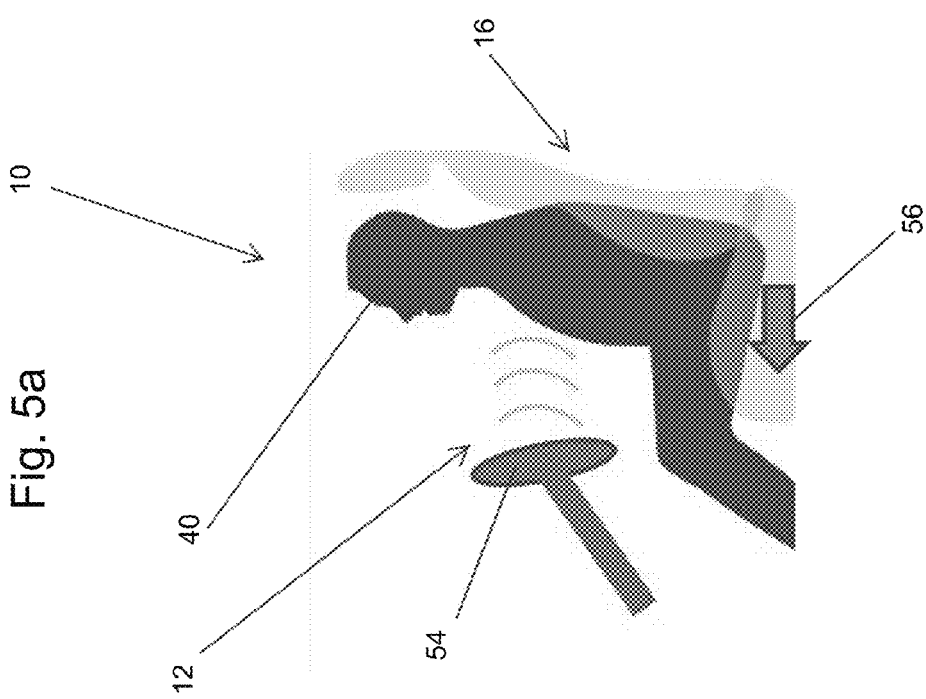

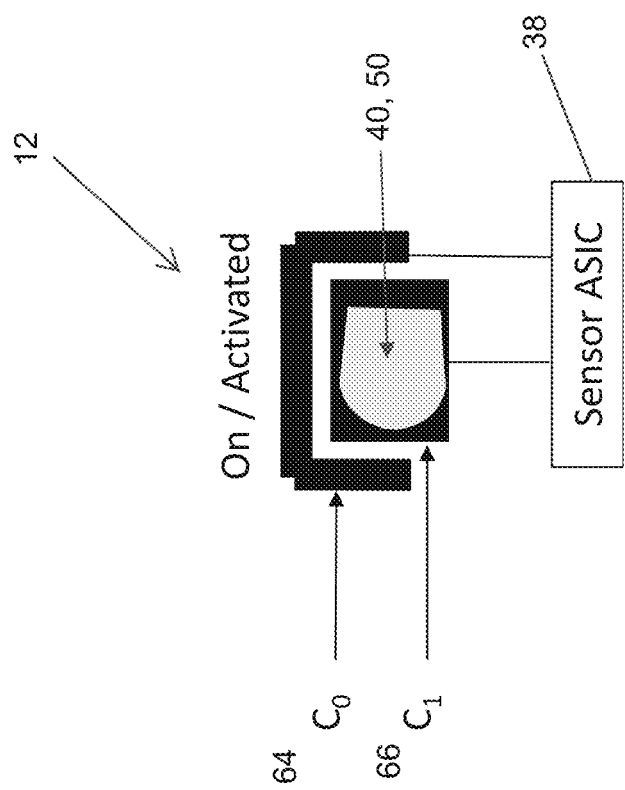

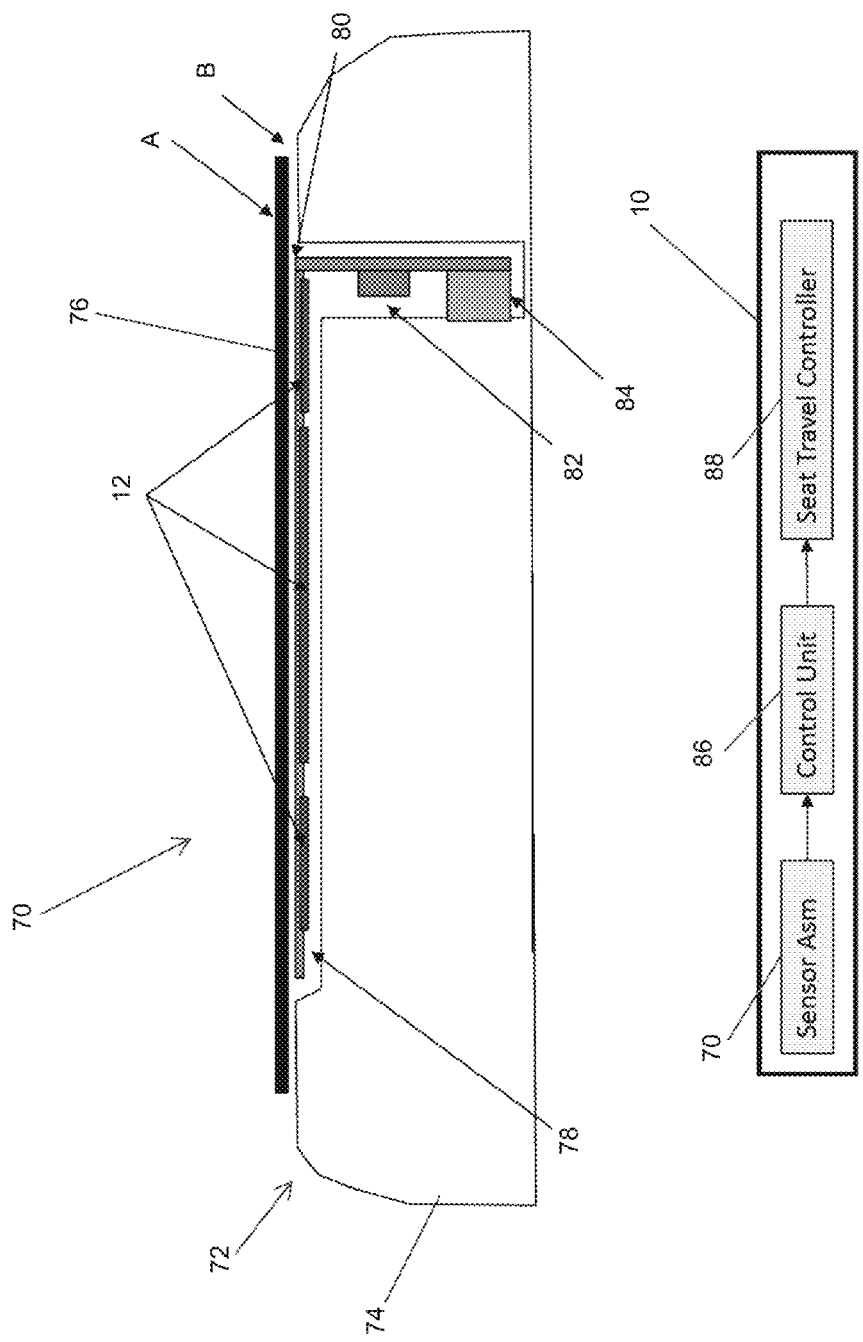

SYSTEM AND METHOD FOR CONTROLLING VEHICLE SEAT MOVEMENT

TECHNICAL FIELD

The following relates to a system and method for controlling the movement of a seat in a vehicle.

BACKGROUND

Automotive vehicles often include electrically powered systems for control of seat movement or seat positions. Such systems may provide for movement or adjustment of various seat portions in a variety of directions, which can include moving a seat bottom forward, rearward, upward and/or downward, as well as forward or rearward reclining or tilting of a seat back.

Such powered movement or position adjustment of seat portions can, however, cause problems. For example, vehicle occupants who may be located in the path of seat movement may be at risk of injury from contact with a moving seat portion, or may be inconvenienced as a result of seat movement or positioning. As well, vehicle components such as bulkheads or knee bolsters may be damaged as a result of contact with a seat portion or occupant which may occur during movement or adjustment of a seat portion.

In that regard, exemplary vehicle seat control systems are shown in U.S. Patent Application Publication No. 2006/0208549 entitled "Automotive Seat With Control System" and International Application Publication No. WO 2008/024306 entitled "Object Detection System And Method For Moving Vehicle Seat." Exemplary sensors for use in vehicle seats are shown in U.S. Patent Application No. 2011/0147051 entitled "Capacitive Switch Sensors On Decorative In-Mold Films Background" and International Patent Application Publication No. WO 2009/103653 entitled "Flexible Seat Sensor Product."

As a result, there exists a need for a system and method for controlling the movement of a vehicle seat which addresses these problems. Such a system and method would include a sensor or sensor assembly and a control unit for determining and/or sensing the presence of an object in order to slow, limit, halt, reverse or otherwise control movement of a vehicle seat. Such a vehicle seat movement control system and method would thereby reduce and/or prevent damage to a vehicle seat or component and/or may reduce and/or prevent injury to a vehicle occupant.

SUMMARY

According to one embodiment disclosed herein, a system is provided for controlling movement of a seat in a vehicle. The system comprises a sensor assembly comprising a sensor configured to sense a presence of an object and to generate an output signal representing a proximity of the object to the sensor. The system further comprises a control unit configured to receive the sensor output signal and to generate a control signal for use in controlling movement of the seat.

According to another embodiment disclosed herein, a system for controlling movement of a seat in a vehicle is provided. The system comprises a sensor assembly comprising a conductive sensor configured to sense a presence of an object and to generate an output signal representing a proximity of the object to the sensor. The system also comprises a control unit configured to receive the sensor output signal and to generate a control signal for use in one of halting and reversing movement of the seat based on a proximity of the object to the sensor.

According to a further embodiment disclosed herein, a method is provided for controlling movement of a seat in a vehicle. The method comprises determining a gap between a sensor and an object when the seat is moving. The method further comprises controlling movement of the seat based on a comparison of the gap to a threshold value.

A detailed description of these embodiments is set forth below together with accompanying drawings.

BRIEF DESCRIPTION OF THE DRAWINGS

FIG. 1b is a simplified flowchart of one embodiment of the system and method for controlling movement of a vehicle seat of the present disclosure, such as for use in the vehicular environment shown in FIG. 1a;

FIG. 3a illustrates another exemplary vehicular environment for one embodiment of the system and method for controlling movement of a vehicle seat of the present disclosure;

FIG. 3b is a simplified flowchart of another embodiment of the system and method for controlling movement of a vehicle seat of the present disclosure, such as for use in the vehicular environment shown in FIG. 3a;

FIG. 4b is a simplified flowchart of another embodiment of the system and method for controlling movement of a vehicle seat of the present disclosure, such as for use in the vehicular environment shown in FIG. 4a;

FIG. 5a illustrates another exemplary vehicular environment for one embodiment of the system and method for controlling movement of a vehicle seat of the present disclosure;

FIG. 5b is a simplified flowchart of another embodiment of the system and method for controlling movement of a vehicle seat of the present disclosure, such as for use in the vehicular environment shown in FIG. 5a;

FIG. 6 is a simplified schematic of a sensor for use in embodiments of the system and method for controlling movement of a vehicle seat of the present disclosure;

FIG. 7a is a cross-sectional diagram of a sensor assembly in an exemplary vehicular environment for use in embodiments of the system and method for controlling movement of a vehicle seat of the present disclosure; and FIG. 7b is a simplified block diagram of an embodiment of the system and method for controlling movement of a vehicle seat of the present disclosure.

DETAILED DESCRIPTION

Figure 1A:
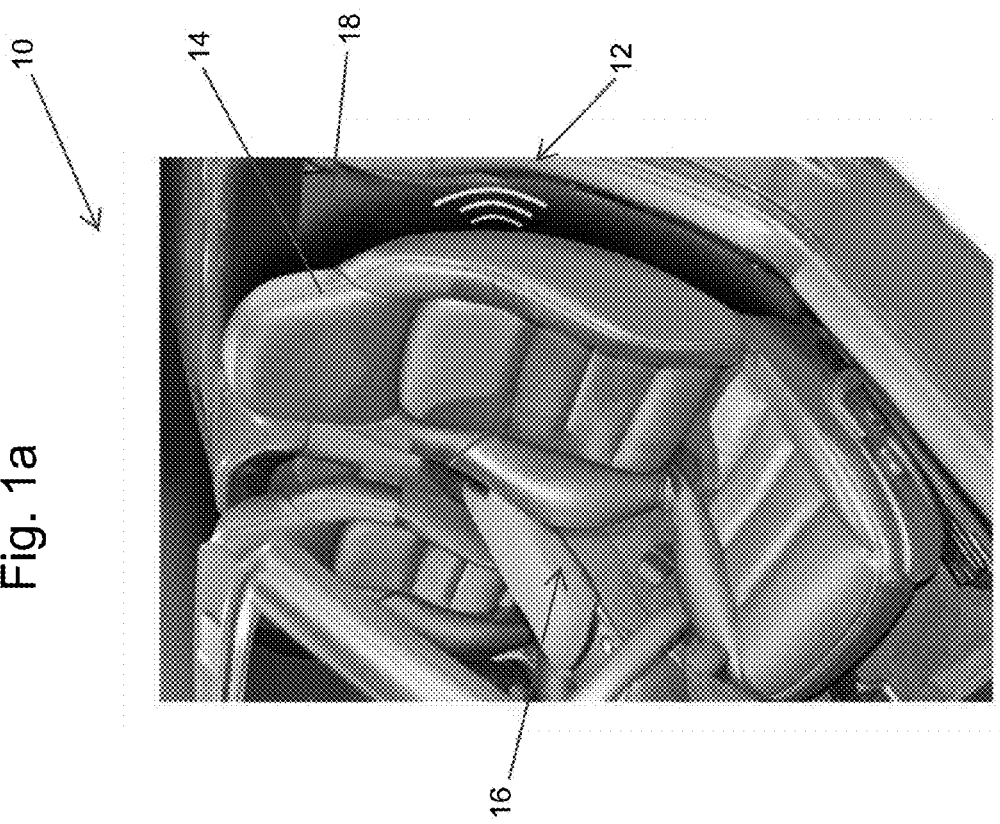
FIG. 1a illustrates an exemplary vehicular environment for one embodiment of the system and method for controlling movement of a vehicle seat of the present disclosure.

As required, detailed embodiments are disclosed herein. However, it is to be understood that the disclosed embodiments are merely exemplary and that various and alternative forms may be employed. The embodiments are included in order to explain principles of the disclosure and not to limit the scope thereof, which is defined by the appended claims. Details from two or more of the embodiments may be combined with each other. The figures are not necessarily to scale. Some features may be exaggerated or minimized to show details of particular components. Therefore, specific structural and functional details disclosed herein are not to be interpreted as limiting, but merely as a representative basis for teaching one skilled in the art.

With reference to the Figures, a more detailed description of embodiments of a system and method for controlling movement of a vehicle seat will be described. For ease of illustration and to facilitate understanding, throughout the following description similar reference numerals have been used to denote similar elements, parts, items or features in the drawings, where applicable. In general, the Figures depict a sensor and/or sensor assembly and control unit, as well as associated methods, for controlling user desired movement of a seat in order to reduce or prevent contact or collisions of the seat or an occupant with another occupant or structures within the vehicle.

Referring now to FIG. 1a, an exemplary vehicular environment is shown for one embodiment of the system 10 and method for controlling movement of a vehicle seat of the present disclosure. As seen therein, a sensor 12 may be positioned in a seat back 14 and may be used to slow, limit, stop, reverse or otherwise control seat movement requested by a user (not shown) and prevent collision of the seat 16 with a vehicle bulkhead 18. In such an embodiment, the sensor 12, which could be capacitive, may be used to detect the material, which could be metallic or conductive, of the bulkhead 18 as the seat back 14 moves rearward. The bulkhead 18 could alternatively be made of a composite material, in which case a conductive material, which may be a strip of conductive material, may be attached to the bulkhead 18. Alternatively, the sensor 12 could be positioned or located on the bulkhead 18 to detect the presence of the seat back 14 during rearward or reclining motion.

Figure 1B:
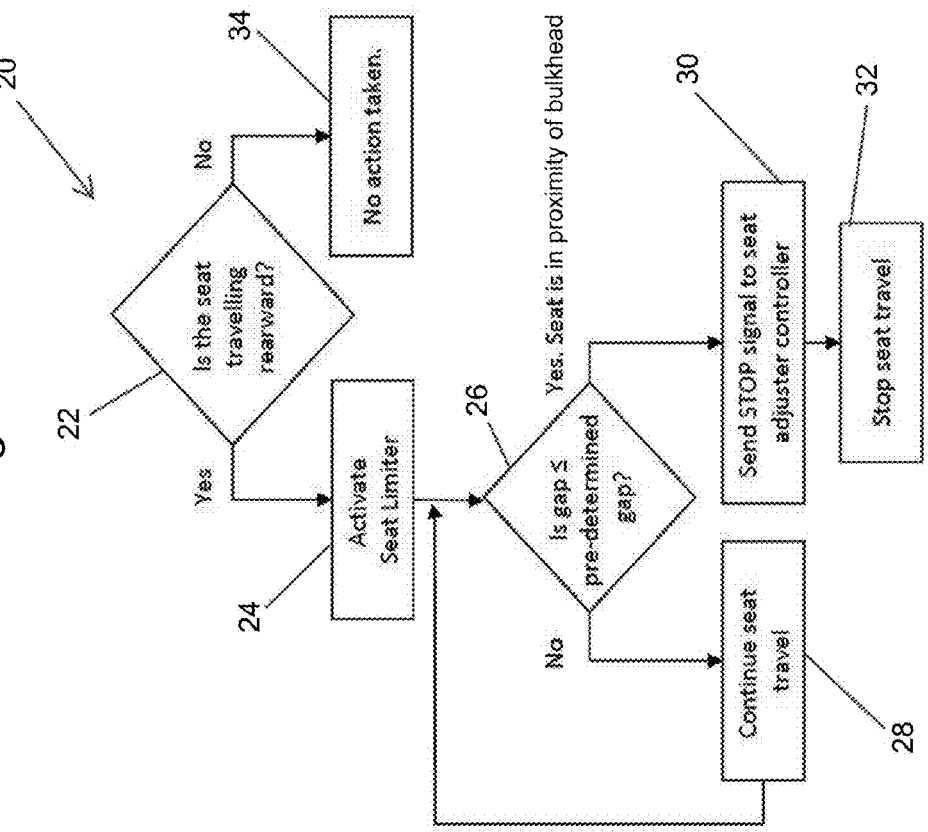

FIG. 1b shows a simplified flowchart of one embodiment of the system 10 and method 20 for controlling movement of a vehicle seat as disclosed herein, such as for use in the vehicular environment shown in FIG. 1a. As seen in those Figures, after a decision has been made that a vehicle seat 16 is moving 22 and a seat limiter has been activated 24, a gap between the sensor 10 and an object such as bulkhead 18 may be detected. Alternatively, if a decision has been made that the vehicle seat is not moving, no action may be taken 34. During vehicle seat movement, such as reward, reclining or tilting movement of the seat back 14, if the gap detected remains greater than a pre-determined threshold 26, continued movement of the seat 16 may be permitted 28. However, when the gap detected is less than or equal to the pre-determined threshold 26, the vehicle seat 16 is in close proximity to the vehicle bulkhead 18 and a "stop" signal may be transmitted 30 to a seat adjustment controller or control unit (not shown) which may stop 32 any further or additional movement of the seat 16 in that direction.

It should be noted that, either alternatively or in addition, one or more other signals may be transmitted to the seat adjustment controller such that movement of the seat 16 could be slowed and/or reversed either before, after or as an alternative to movement of the seat 16 being stopped, as may be appropriate or desired. A warning signal, which may be an audio, visual, haptic or any other type of warning signal, may also be provided as the detected gap decreases toward the pre-determined threshold.

Figure 2C:
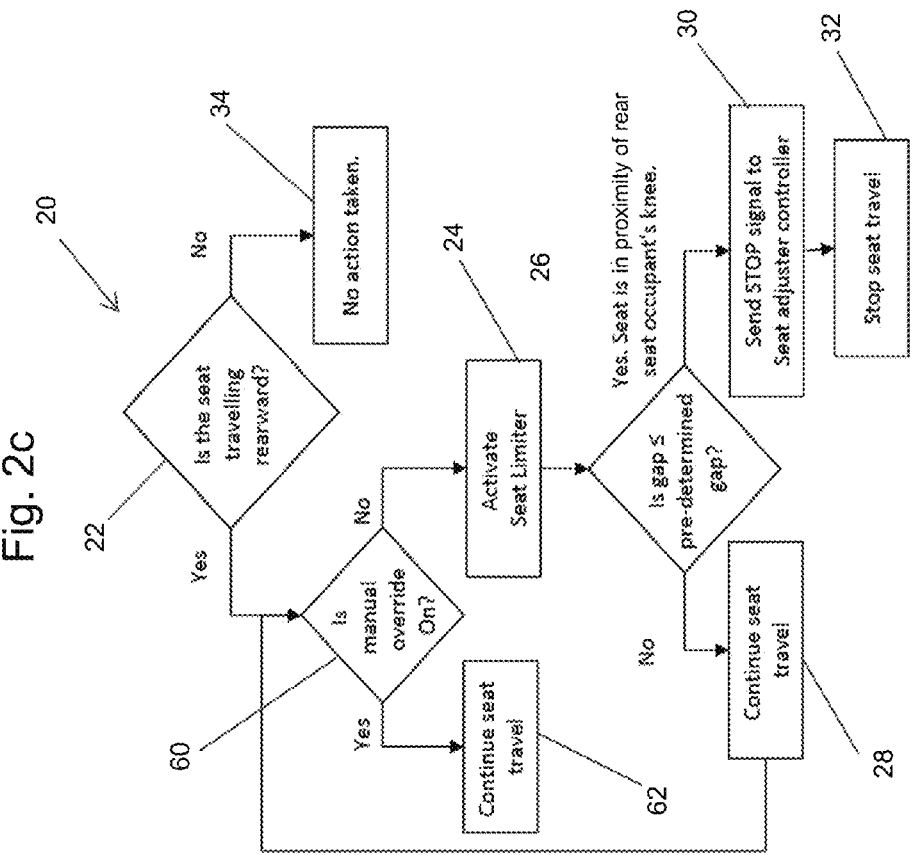
FIG. 2c is a simplified flowchart of another embodiment of the system and method for controlling movement of a vehicle seat of the present disclosure, such as for use in the vehicular environments shown in FIGS. 2a and 2b.
Figure 2A:
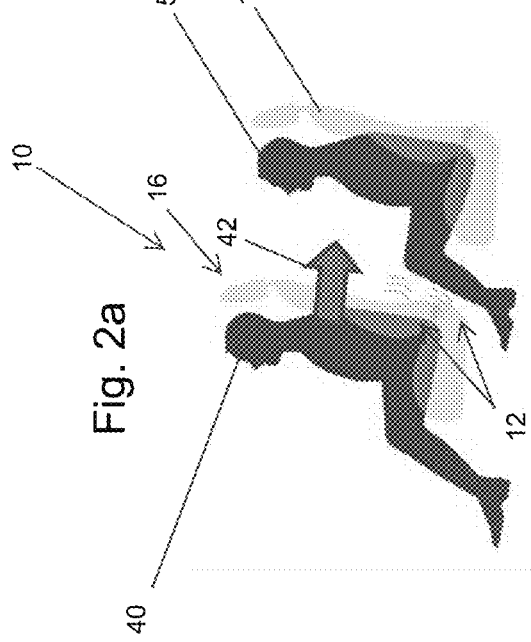
FIG. 2a illustrates another exemplary vehicular environment for one embodiment of the system and method for controlling movement of a vehicle seat of the present disclosure.
Figure 2B:
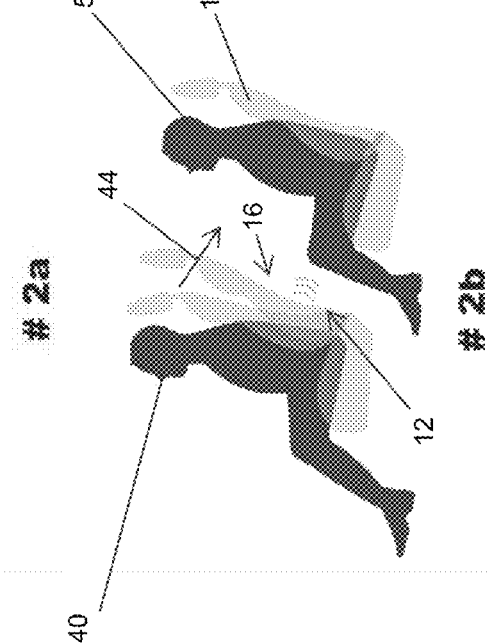
FIG. 2b illustrates another exemplary vehicular environment for one embodiment of the system and method for controlling movement of a vehicle seat of the present disclosure.

Referring next to FIGS. 2a, 2b and 3a, additional exemplary vehicular environments are shown for additional embodiments of the system 10 and method 20 for controlling movement of a vehicle seat 16 of the present disclosure. As seen therein, a sensor 12 may be located in a seat back 14 or seat bottom portion 90 for use in slowing, limiting, stopping, reversing or otherwise controlling movement of the seat 16 by a user 40 in a rearward 42, tilting or reclining 44, or downward 46 direction in order to prevent collision or contact of the seat 16 with the knees, legs, feet or ankles of a vehicle passenger 50 located behind the seat 16.

Figure 4B:
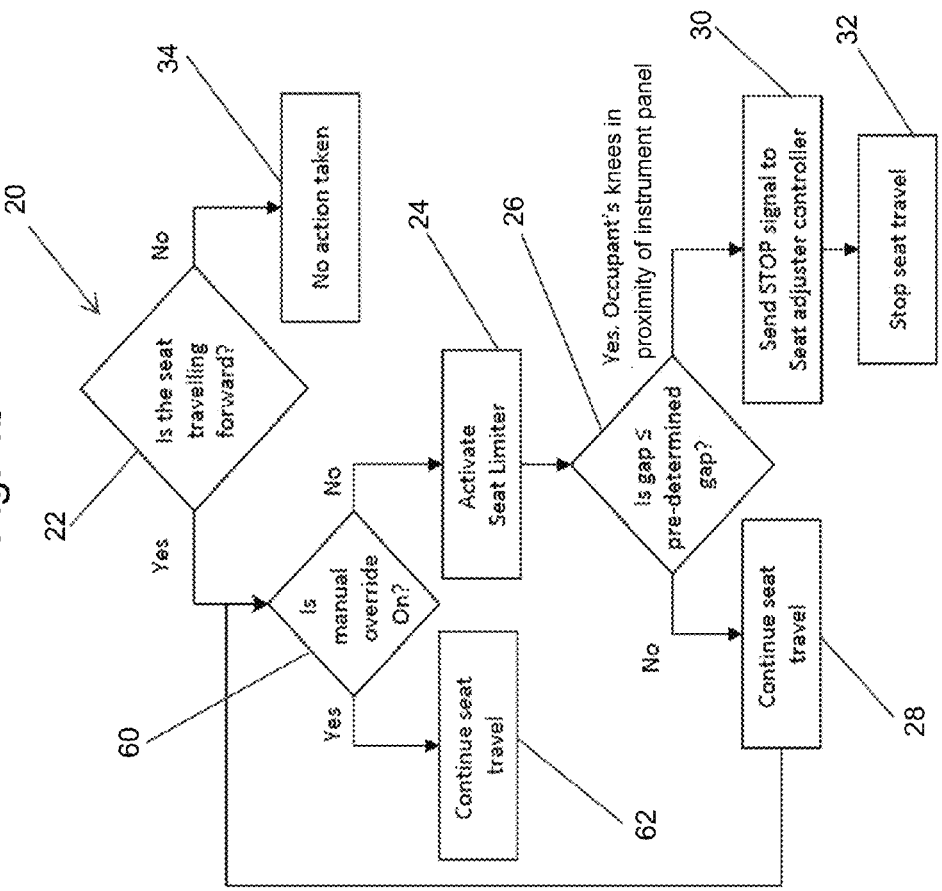
Figure 4A:
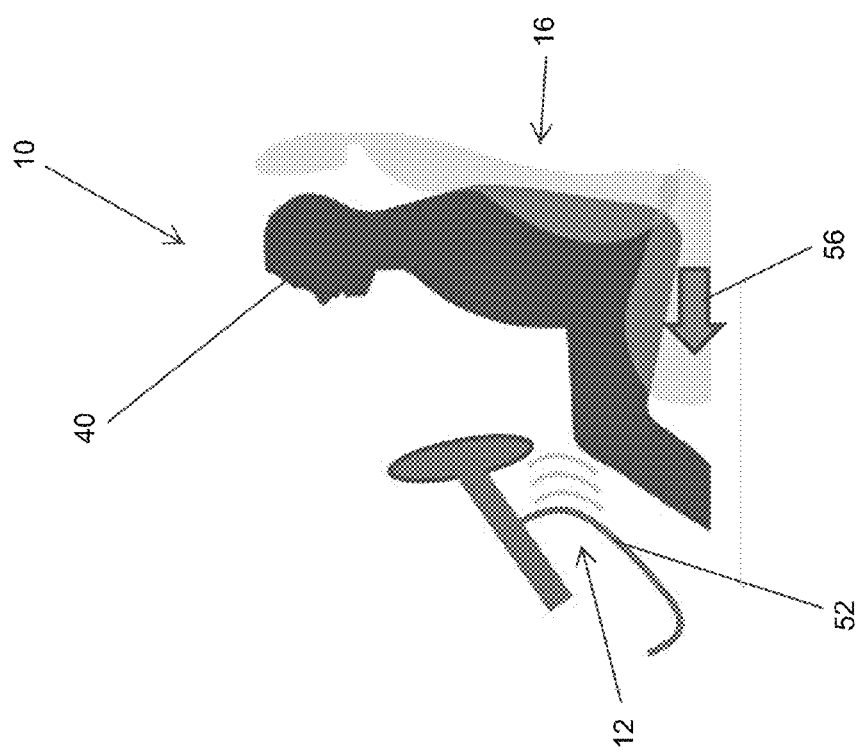
FIG. 4a illustrates another exemplary vehicular environment for one embodiment of the system and method for controlling movement of a vehicle seat of the present disclosure.

FIGS. 4a and 5a illustrate additional exemplary vehicular environments for additional embodiments of the system 10 and method 20 for controlling movement of a vehicle seat 16 of the present disclosure. As seen therein, a sensor 12 may be positioned in a knee bolster 52 or steering wheel/column 54 to help slow, limit, stop, reverse or otherwise control user movement of the seat 16 in a forward 56 direction in order to prevent contact or collision of the knee bolster 52 with the knees of the seat occupant 40, or to control the distance between the steering wheel/column 54 and the chest of the seat occupant 40. As is apparent to those of ordinary skill, the system 10 and method 20 described herein are suitable for use in or with any seat in a vehicle, including front seats, second row seats and/or third row seats.

Referring now to FIGS. 2c, 3b, 4b and 5b, simplified flowcharts are shown of additional embodiments of the system 10 and method 20 for controlling movement of a vehicle seat 16 of the present disclosure. As seen in those Figures, after a decision has been made that a vehicle seat 16 is moving 22 and a seat limiter has been activated 24, a gap between the sensor 12 and an object such as an occupant 50 or user 40, may be detected. During rearward 42, tilting or reclining 44, downward 46, or forward 56 movement of the seat 16 or seat back 14, if the gap detected remains greater than a pre-determined threshold 26, continued movement of the seat may be permitted 28. However, when the gap detected is less than or equal to the pre-determined threshold 26, the vehicle seat 16 is in close proximity to the knees, ankles or legs of an occupant 50, or the knees or chest of a user 40 are in close proximity to a knee bolster 52 or steering column 54, and a "stop" signal may be transmitted 30 to a seat adjustment controller which may stop 32 any further or additional movement of the seat 16 in that direction.

It should be noted that, either alternatively or in addition, one or more other signals may be transmitted to the seat adjustment controller such that movement of the seat 16 could be limited, slowed and/or reversed either before, after or as an alternative to movement of the seat 16 being stopped, as may be appropriate or desired. For example, in the environment depicted in FIG. 5a, movement of the seat 16 could be limited and/or halted to prevent a user 40 from positioning the seat 16 at a location where the distance between the chest of the user 40 and an airbag (not shown) in steering wheel 54 may affect operation of the airbag. In that regard, a control unit (see FIG. 7b) may provide a signal to an airbag control unit (not shown) indicating such a condition, so that the airbag control unit could inflate the airbag at a lower velocity during deployment.

A warning signal, which may be an audio, visual, haptic or any other type of warning signal, may also be provided as the detected gap decreases toward the pre-determined threshold. A manual override 60 of the seat limiter may also be added to allow seat movement to continue 62 or resume, which could be employed where an occupant 50 moves or adjust position in order to thereby create space for further movement of the seat 16.

Referring again to FIG. 5*a*, it should also be noted that, where the sensor 12 is located in the steering wheel/column 54, the chest of a user 40 may come into proximity with the sensor 12 and/or steering wheel/column 54 as a result of angular and/or telescopic adjustment or movement of the position of steering wheel/column 54 relative to the user 40. This may result even without movement or travel of the seat 16, that is, where the chest of the user 40 had not been in proximity to the sensor 12 and/or steering wheel/column 54 due to the position or location of the seat 16 as a result of movement of the seat 16. In such circumstances, a warning signal, which again may be an audio, visual, haptic or any other type of warning signal, may be provided to indicate proximity of the user 40 and the steering wheel/column 54.

Similarly, with reference to FIG. 4*a*, where the sensor 12 is located in the knee bolster 52, the knees of a user 40 may come into proximity with the sensor 12 and/or knee bolster 52 as a result of adjustment or movement of a thigh extender or thigh support associated with the seat 16. This may result even without movement or travel of the seat 16 overall, that is, where the knees of the user 40 had not been in proximity to the sensor 12 and/or knee bolster 52 due to the position or location of the seat 16 as a result of movement of the seat 16 itself. As a result, it should be understood that movement of the seat 16 as described herein includes movement in any direction of the seat 16 overall, or any portion, section or part of the seat 16, such as a seat back 14, seat bottom portion 90, thigh extender or support, or any other seat portion, section, or part, in any direction.

FIG. 6 is a simplified schematic of a sensor 12 for use in embodiments of the system 10 and method 20 for controlling movement of a vehicle seat 16 of the present disclosure. As seen therein, the sensor 12 may be capacitive in nature and may comprise capacitors $C_0$ 64 and $C_1$ 66, as well as one or more application specific integrated circuits (ASIC) 38. A conductive object (such as a bulkhead 18, seat 16 or seat portion, or a body part of a user 40 or occupant 50) closer to capacitor $C_1$ 66 increases the capacitance of $C_1$ 66 more than that of capacitor $C_0$ 64. Thus, the change in the capacitance of $C_1$ 66 is a function of the distance of an object 16, 18, 40, 50 from the capacitor $C_1$ 66, as well as the area of the pad of capacitor $C_1$ 66 coupled to the object 16, 18, 40, 50, which provides an indication of the size of the sensed object 16, 18, 40, 50 in order to help prevent false indications of proximity. The sensor 12 may be configured such that a sufficient increase in the capacitance of $C_1$ 66 relative to that of capacitor $C_0$ 64 detects a switch activation, thereby indicating the presence of an object 16, 18, 40, 50, which may be used to slow, limit, stop, reverse or otherwise control seat travel, movement or position. Filtering may also be employed to require a predetermined time lapse before such a detected change in capacitance will be accepted for purposes of switch activation.

Referring next to FIG. 7*a*, a cross-sectional diagram is shown of a sensor assembly 70 in an exemplary vehicular environment for use in embodiments of the system 10 and method 20 for controlling movement of a vehicle seat 16 of the present disclosure. As seen therein, a structure 72, which may be a seat back 14, bulkhead 18, knee bolster 52, steering wheel/column 54, or other structure, may comprise a body 74 and a trim 76, which may have an outside surface (A) and substrate (B). One or more conductive sensors 12, which may be capacitive sensors, may be provided as part of a flexible circuit 78 (which may have a thickness of approximately 0.002 inches) positioned between the body 74 and the trim 76 of the structure 72. The sensor assembly 70 may also include a printed circuit board 80 having other electrical components 82 and/or a connector or electrical wire harness interface 84.

FIG. 7*b* shows a simplified block diagram of an embodiment of the system 10 and method 20 for controlling movement of a vehicle seat 16 of the present disclosure. As seen therein, the sensor assembly 70 may be provided in communication with a control unit 86, which may be provided in communication with a seat movement controller 88, thereby enabling operation of the system 10 and associated method 20 for slowing, limiting, stopping, reversing or otherwise controlling seat movement as described herein.

As seen in the Figures, the present disclosure describes a system 10 for controlling movement of a seat 16 in a vehicle, which may include a sensor assembly 70 having a sensor 12 configured to sense a presence of an object 16, 18, 40, 50 and to generate an output signal representing a proximity of the object 16, 18, 40, 50 to the sensor 12, as well as a control unit 86 configured to receive the sensor output signal and to generate a control signal for use in controlling movement of the seat 16, including any portion thereof, which movement may be in any direction. The control signal may be provided for use in halting, slowing, reversing, limiting or otherwise controlling movement of the seat 16 based on the proximity of the object 16, 18, 40, 50 to the sensor 12. The control signal may alternatively or additionally be for use in providing a warning to a user based on the proximity of the object 16, 18, 40, 50 to the sensor 12.

The system 10 may also include a switch (not shown) adapted to receive user input. The switch may be provided for use in generating an override signal for use in overriding the control signal to permit further or additional movement of the seat 16. The system 10 may also include a seat movement controller 88 configured to control movement of the seat 16. The seat movement controller 88 may be adapted to receive the control signal generated by the control unit 86 for use in controlling movement of the seat 16.

The sensor 12 may comprise a capacitive sensor, the output signal generated may represent a gap between an object 16, 18, 40, 50 and the sensor 12, and the control unit 86 may compare the gap to a threshold value. The sensor assembly 70 and/or sensor 12 may be adapted for attachment to a vehicle surface, for example a surface of a seat back portion 14, a seat bottom portion 90, a bulkhead 18, a knee bolster 52, a steering wheel 54, an instrument panel, a pillar (such as the vehicle "B" pillar) or any other vehicle surface.

The Figures still further illustrate a method 20 for controlling movement of a seat 16 in a vehicle, which may include determining a gap between a sensor 12 and an object 16, 18, 40, 50 when the seat 16 is moving, and controlling movement of the seat 16 based on a comparison of the gap to a threshold value. Determining a gap between the sensor 12 and an object 16, 18, 40, 50 may comprise activating a seat movement controller 88 provided in communication with a sensor assembly 70 configured to sense a presence of an object 16, 18, 40, 50. Activating a seat movement controller 88 may comprise determining whether the seat 16 is moving.

Controlling movement of the seat 16 may comprise generating a control signal for use slowing, halting, limiting or reversing movement of the seat 16. Controlling movement of the seat 16 may also comprise generating a control signal for use in providing a warning to a user 40. The method 20 may further comprise generating an override signal in response to user input, the override signal for use in overriding the control signal to permit further or additional movement of the seat 16 after slowing, halting, limiting or reversing movement of the seat 16. Once again, as described herein, it should be understood that movement of the seat 16 includes movement in any direction of the seat 16 overall, or any portion, section or part of the seat 16, such as a seat back 14, seat bottom portion 90, thigh extender or support, or any other seat portion, section, or part, in any direction.

As is readily apparent from the foregoing, a system and method for controlling movement of a vehicle seat have been described. The embodiments described may include a sensor or sensor assembly and a control unit for determining and/or sensing the presence of an object in order to slow, limit, halt, reverse or otherwise control movement of a vehicle seat. In such a fashion, a vehicle seat movement control system and method are provided that reduce and/or prevent damage to a vehicle seat and/or may reduce and/or prevent injury to a vehicle occupant.

While various embodiments of a system and method for controlling the movement of a seat in a vehicle have been illustrated and described herein, they are exemplary only and it is not intended that these embodiments illustrate and describe all those possible. Instead, the words used herein are words of description rather than limitation, and it is understood that various changes may be made to these embodiments without departing from the spirit and scope of the following claims.

What is claimed is:

1. A system for controlling movement of a seat in a vehicle, the system comprising:
   a sensor assembly comprising a sensor configured to sense a presence of an object and to generate an output signal representing a proximity of the object to the sensor;
   a control unit configured to receive the sensor output signal and to generate a control signal for use in controlling movement of the seat; and
   a switch adapted to receive user input, the switch for use in generating an override signal for use in overriding the control signal to allow adjustment of a position of i) a non-seat vehicle surface supporting the sensor or ii) a seat member supporting the object, to thereby permit additional controlled movement of the seat by a seat movement controller configured to receive the control signal.

2. The system of claim 1 wherein the control signal is for use in halting movement of the seat based on the proximity of the object to the sensor.

3. The system of claim 1 wherein the control signal is for use in reversing movement of the seat based on the proximity of the object to the sensor.

4. The system of claim 1 wherein the control signal is for use in providing a warning to a user based on the proximity of the object to the sensor.

5. The system of claim 1 wherein the sensor comprises a capacitive sensor, the output signal generated represents a gap between the object and the sensor, and the control unit compares the gap to a threshold value.

6. The system of claim 1 wherein the sensor is adapted for attachment to an adjustable non-seat surface of the vehicle.

7. The system of claim 1 further comprising a seat movement controller configured to control movement of the seat, the seat movement controller adapted to receive the control signal generated by the control unit for use in controlling movement of the seat.

8. A system for controlling movement of a seat in a vehicle, the system comprising:
   a sensor assembly comprising a conductive sensor configured to sense a presence of an object and to generate an output signal representing a proximity of the object to the sensor; and
   a control unit configured to receive the sensor output signal and to generate a control signal for use in halting or reversing movement of the seat based on a proximity of the object to the sensor;
   a switch adapted to receive user input, the switch for use in generating an override signal for use in overriding the control signal to allow adjustment of a position of i) a non-seat member supporting the sensor or ii) a seat member supporting the object, to thereby permit additional controlled movement of the seat.

9. The system of claim 8 further comprising a seat movement controller configured to control movement of the seat, the seat movement controller adapted to receive the control signal generated by the control unit for use in controlling movement of the seat.

10. The system of claim 8 wherein the sensor assembly comprises a capacitive sensor, the output signal generated represents a gap between the object and the sensor, and the control unit compares the gap to a threshold value.

11. The system of claim 8 wherein the sensor assembly is adapted for attachment to an adjustable non-seat vehicle surface.

12. A method for controlling movement of a seat in a vehicle, the method comprising:
   determining a gap between a sensor and an object when the seat is moving;
   controlling movement of the seat based on a comparison of the gap to a threshold value;
   overriding, in response to user input, the controlled movement of the seat; and
   adjusting a position of i) a non-seat member supporting the sensor or ii) a seat member supporting the object, to thereby permit further controlled movement of the seat after halting or reversing movement of the seat.

13. The method of claim 12 wherein determining a gap between the sensor and an object comprises activating a seat movement controller comprising a sensor assembly configured to sense a presence of an object.

14. The method of claim 12 wherein controlling movement of the seat comprises generating a control signal for use in halting or reversing movement of the seat.

15. The method of claim 14 wherein overriding comprises generating an override signal in response to user input, the override signal for use in overriding the control signal to permit further movement of the seat after one of halting and reversing movement of the seat.

16. The method of claim 13 wherein the sensor assembly comprises a capacitive sensor adapted for attachment to an adjustable non-seat vehicle surface.

17. The method of claim 13 wherein activating a seat movement controller comprises determining whether the seat is moving.

18. The method of claim 13 wherein controlling movement of the seat comprises generating a control signal for use in providing a warning to a user.

* * * * *